May 26, 1931.   B. S. MOORE   1,806,764
SPARE WHEEL LOCKING DEVICE
Filed Feb. 24, 1930    3 Sheets-Sheet 1
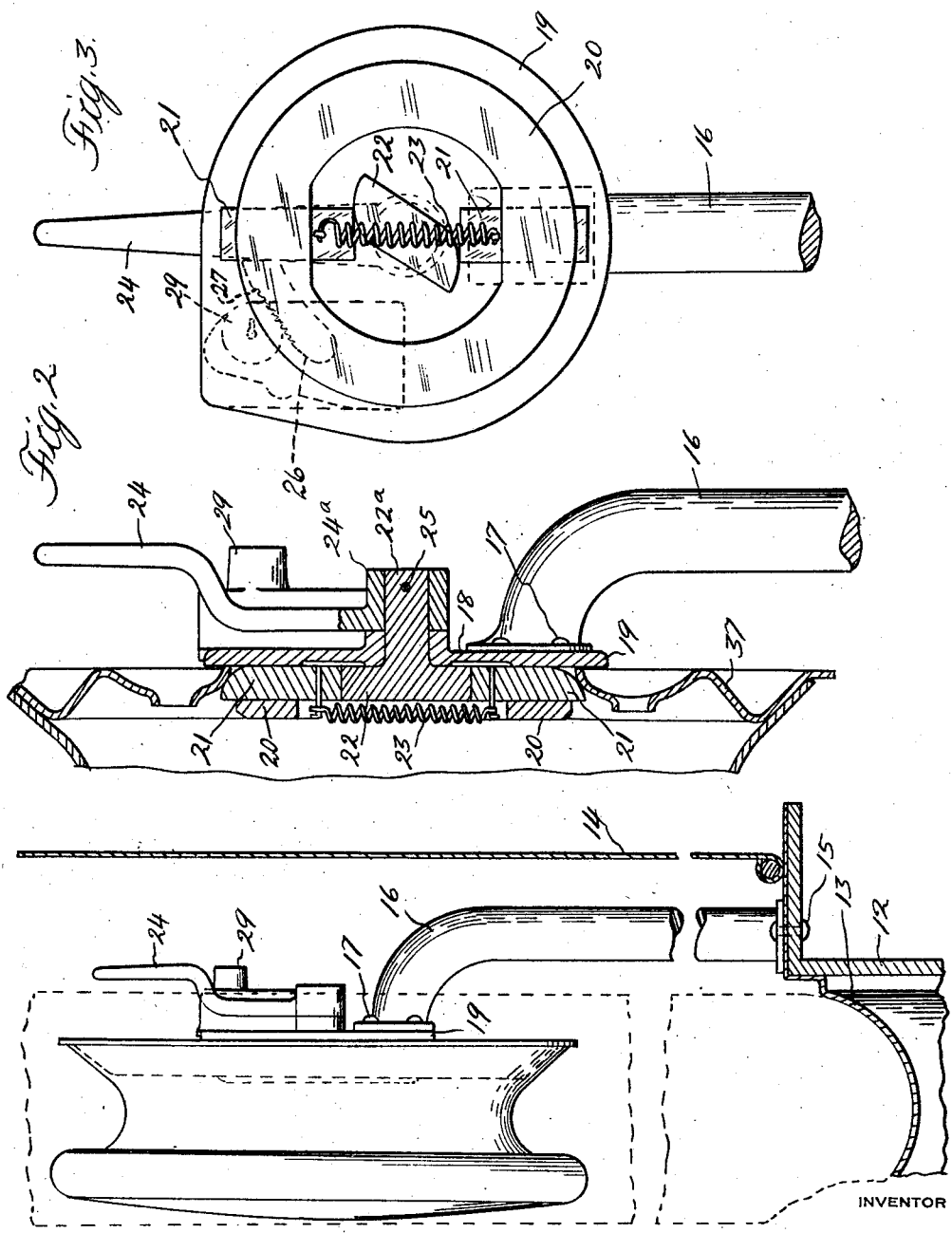
INVENTOR
Benjamin S. Moore
BY
ATTORNEYS

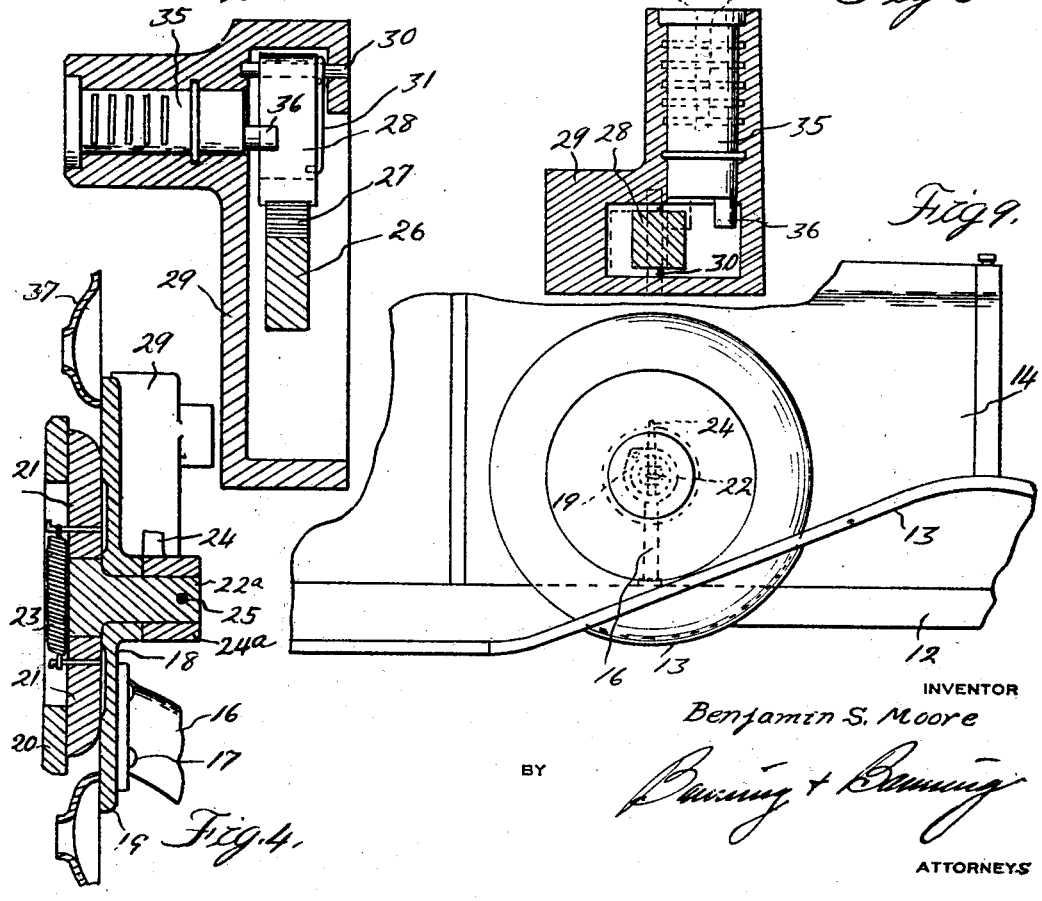

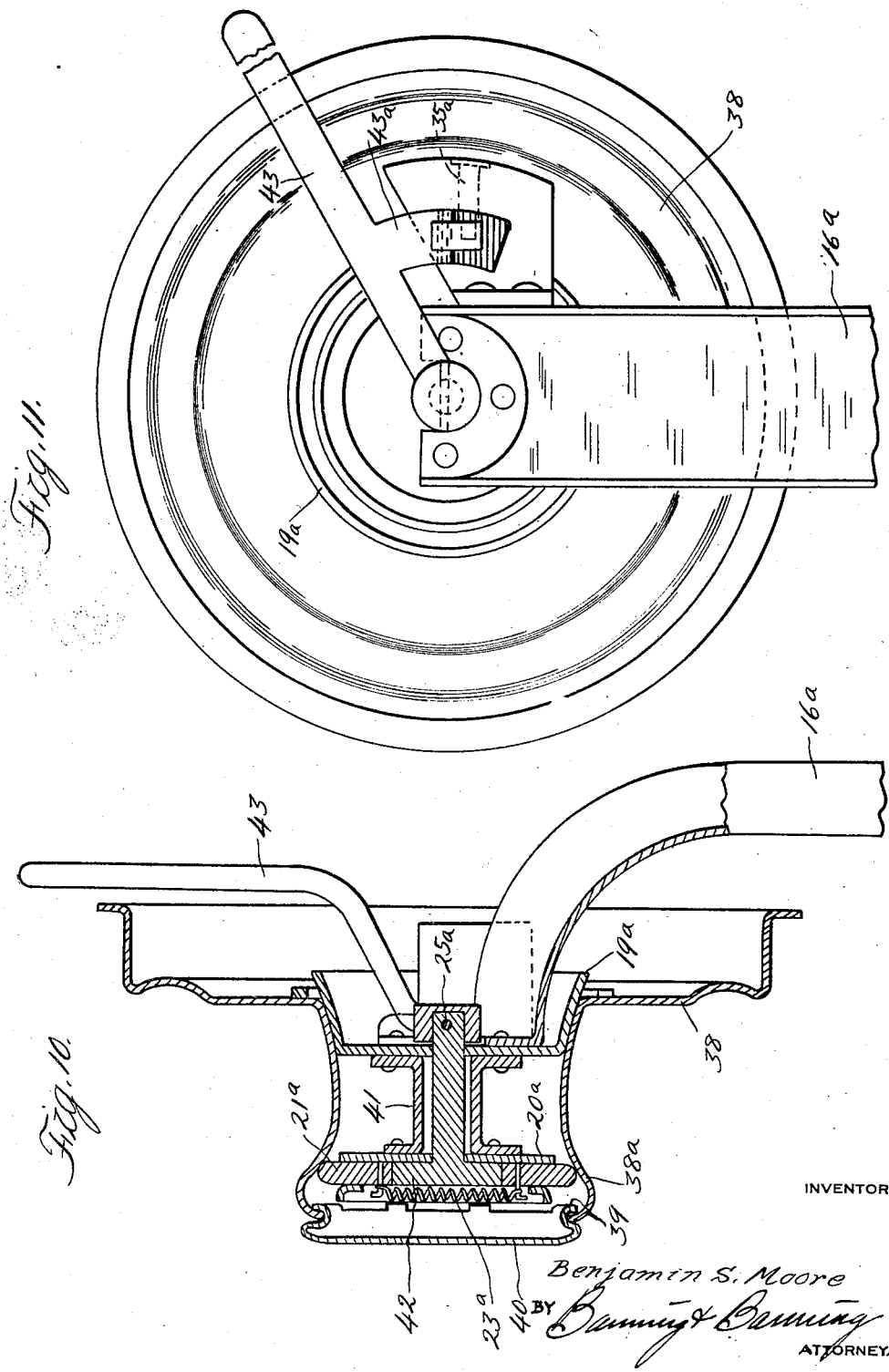

Patented May 26, 1931

1,806,764

UNITED STATES PATENT OFFICE

BENJAMIN S. MOORE, OF DETROIT, MICHIGAN, ASSIGNOR TO OAKES PRODUCTS CORPORATION, OF NORTH CHICAGO, ILLINOIS, A CORPORATION OF MICHIGAN

SPARE WHEEL LOCKING DEVICE

Application filed February 24, 1930. Serial No. 430,494.

This invention relates to spare wheel locking devices for securing the spare wheels of automobiles and other vehicles adjacent the hood and front fenders of the vehicle.

One of the objects of the present invention is the provision of a simple and effective locking device that can be readily locked without the medium of a key, but cannot be unlocked except through the medium of the proper key.

Another object of this invention is the arrangement of an abutment suitably secured upon the vehicle and a pair of locking members positioned adjacent the abutment for pressing a portion of the spare wheel into firm engagement with the abutment whenever the locking members are in locking position.

A further object of this invention is the provision of an operating handle for moving the locking members into and out of locking position, a portion of the handle itself being adapted to be engaged by the key-operated locking mechanism whenever the device is in locking position.

Other objects and advantages will be apparent from the following description in which reference is made to the accompanying drawings showing a preferred embodiment of my invention, and wherein similar reference numerals designate similar parts throughout the several views.

In the drawings:

Figure 1 is a vertical sectional view through the front fender and adjacent parts of an automobile equipped with my improved locking device, the locking device being shown in elevation with the hub portion of a spare wheel locked thereon.

Figure 2 is an enlarged vertical sectional view through the locking device and a portion of a spare wheel locked thereon.

Figure 3 is a front elevation of my improved locking device in locked position but without a spare wheel thereon.

Figure 4 is a vertical sectional view corresponding to Figure 2 but with the locking members in unlocked positions.

Figure 5 is a rear view of my improved locking device in locked position but without a spare wheel thereon.

Figure 6 is a detail vertical section through the key-operated locking mechanism with the cooperating portions of the operating handle in locking position.

Figure 7 is a detail vertical view taken substantially on the line 7—7 of Figure 6.

Figure 8 is a detail cross-section taken substantially on the line 8—8 of Figure 6.

Figure 9 is a side elevation of the hood and front fender of an automobile with a spare wheel in locked position thereon, and my improved locking device shown in dotted lines.

Figure 10 is a central vertical section through a modified embodiment of my invention, with the hub portion of a spare wheel locked thereon, and Figure 11 is a rear elevation thereof.

Referring now to the drawings, the numeral 12 represents one of the main frame members of an automobile, 13 a front fender secured thereto, and 14 a side member of the hood, which, when closed, rests upon the upper surface of a portion of the fender 13. Suitably secured upon the frame member 12, as by rivets 15, is a post 16, the upper portion of which is bent outwardly from the hood member 14 and is secured, as by rivets 17, to the body portion 18 of my improved locking device. The body portion 18 is shown in front and rear elevations in Figures 3 and 5, and in section in Figures 2 and 4, and comprises a centrally apertured rear wall 19 adapted to serve as an abutment for the hub portion of a spare wheel and a centrally apertured forward portion 20 of lesser diameter than the rear portion 19, but the central aperture of which is of greater area than that of the rear wall. The front and rear members are integrally formed with or suitably connected to each other and form front and rear guides for a pair of locking members 21 arranged to slide in suitable aligned apertures between the front and rear members. The outer extremities of the locking members 21 are inclined toward the rear of the locking device so as to exert a wedging action upon a portion of the hub of a spare wheel positioned upon the locking device so as to force said hub portion into firm engagement with the rear wall 19 of the locking device (note Fig. 2). The inner extremities of the locking members 21 engage opposed faces of the operating cam 22, and are preferably held in firm engagement therewith by suitable means, such as the coil spring 23. The cam 22 is herein shown as formed with a stem 22$^a$ extending rearwardly through the central aperture of the rear wall 19 of the body member, and with its rear extremity secured to the hub portion 24$^a$ of an operating handle 24, as by the pin 25. By virtue of this arrangement, movement of the operating handle 24 will serve to rotate the cam 22 to either force the locking members 21 outwardly against the tension of the spring 23 or to permit the withdrawal of the locking members 21 by the spring. As best shown in Figures 3 and 5, the operating handle 24 is formed with an integral arm 26 provided on its upper face with serrations 27 for cooperation with the latch member 28 of the key-operated locking mechanism. The arm 26 is herein shown as substantially circumferentially arranged with its center substantially co-incident with the center of the hub portion 24$^a$ of the handle so that when the handle is moved the path of the arm 26 will be arcuate. Suitably mounted upon the rear wall 19 of the locking device is a lock casing 29, best shown in Figures 5-8, wherein the latch member 28 is pivotally mounted, as upon the hidden pin 30, and spring-pressed, as by the spring 31, so that its free extremity will extend into the path of movement of the serrated portion of the arm 26 whenever the latch member is free to move. An aperture in the side of the lock casing 29 permits the entry of the handle arm 26, and preferably the upper wall of such aperture is provided with a shouldered portion 32 and lateral extension 33 cooperating with a shoulder 34 on the handle arm at one extremity of the serrations 27. (Note Fig. 6.) This permits the entry of the shoulder 34 below the lateral extension 33 when the handle is locked, closing a possible gap wherein a sharpened tool might otherwise be inserted for pressing against the latch member 28 to disengage it from the handle arm. With the present arrangement, even if a wire or the like might be forced between the lateral extension 33 and shoulder 34, it would be brought into engagement with the shoulder 32, and so be prevented from engaging the latch member 28. A key-operated lock barrel 35, preferably of the multi-tumbler variety, is suitably secured in the lock casing 29, and carries at its rear extremity an offset pin 36, the rear portion of which can be brought into engagement with the pivoted latch member 28 whenever the lock barrel is suitably rotated by its key.

The operation of my improved locking device is believed to be apparent. With a spare wheel locked thereon, substantially as shown in Figures 1 and 2, it is only necessary to insert the proper key into the aperture of the lock barrel 35 and rotate the lock barrel through a half revolution. This brings the offset pin 36 into engagement with the pivoted latch member 28 and lifts the latch member out of engagement with the serrations 27 of the handle arm 26. The handle can then be swung through a partial revolution to turn the cam 22 to a position permitting the withdrawal of the locking members 21 from the positions shown in Figure 2 to substantially the positions shown in Figure 4, out of engagement with hub portion of the spare wheel. The key may then be withdrawn from the lock, and the latch 28 permitted to swing to its former position. The spare wheel can then be removed from the locking device by moving it outwardly. Should it be desired to replace the removed wheel by another, as is customary in changing wheels on an automobile, the new wheel may be quickly positioned upon the locking device by merely placing its tire portion in the well of the fender 13 and moving its hub portion toward the hood of the car until it engages the rear wall 19 of the locking device. The operating handle 24 is then swung toward the lock casing 29 until the serrations of its arm 26 engage the pivoted latch 28 of the locking mechanism. This movement of the handle turns the cam 22 to force the locking members 21 outwardly into engagement with the hub portion 37 of the spare wheel, and further movement of the locking members 21 will then serve to firmly press the hub portion of the wheel against the rear wall 19 of the locking device to prevent rattling of the spare wheel when the vehicle is in motion. It will be observed that it is not necessary to use a key in locking the new wheel upon the locking device.

In Figures 10 and 11, I have shown a modified form of my locking device for use with wheels having hub portions of different shape from that shown in Figures 1-9 inclusively. As best shown in Figure 10, the spare wheel 38 is formed with a hub portion of comparatively small diameter, the outermost portion of which is flared as at 38$^a$ and shaped to receive inwardly bent tabs 39 of the ornamented hub cap 40. A portion of the hub inwardly of the hub cap is of lesser diameter than such flared portion, and I utilize such flared portion to aid in the positioning and locking of the wheel upon my improved locking device. The post 16$^a$ is herein shown as of channel formation and at its upper extremity carries a rear portion 19$^a$ substantially frusto-conical in shape. The forward wall 20$^a$ is spaced from the rear wall 19$^a$ by a hollow spool shaped spacer 41. The cam 42 engages the inner extremities of the locking members 21$^a$ and is adapted to force these members outwardly against the tension of the coil spring 23ª. The stem of the cam 42 is elongated and extends through the hollow spacer 41 and central apertures in the front and rear walls of the locking device, its rear portion being secured, as by the pin 25ª to the hub portion of the operating handle 43. The handle 43 is formed with a curved arm 43ª having serrations on one of its faces for engagement with a pivoted latch member, the position of which is controlled by the rotation of a key-operated lock barrel 35ª, in substantially the same manner as in the previously described embodiment. The periphery of the rear wall 19ª is adapted to be engaged by the inner extremity of the hub portion of the spare wheel, and when so engaged, the flared portion 38ª of the wheel may be contacted by the outer portions of the locking members 21ª when pressed outwardly by suitable rotation of the cam 42. The outer extremities of the locking members 21ª are shaped to exert a wedging action upon the flared portion 38ª of the wheel to force it rearwardly into engagement with the conical rear wall 19ª to thereby prevent rattling of the wheel.

When it is desired to remove the spare wheel from the locking device, it is only necessary to rotate the lock barrel by its appropriate key to disengage the spring-pressed latch member from the handle arm 43ª. The handle 43 can then be swung to permit the locking arms 21ª to be drawn inwardly by the spring 23ª. The wheel can then be removed by moving it outwardly.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

I claim:

1. In a spare wheel lock, the combination of an abutment, latch members slidably mounted on the abutment, means for moving the latch members into engagement with the central portion of a wheel, and a lock for locking said means while in contact with the wheel.

2. In a spare wheel lock, the combination of an abutment supported from the main frame of an automobile, latch members slidably mounted on the abutment, a cam adapted to move the latch members into engagement with the hub portion of a spare wheel, and a lock to prevent movement of the cam when in one position.

3. In a spare wheel lock, the combination of an abutment supported from the main frame of an automobile, latch members having inwardly curved ends slidably mounted on the abutment, a cam adapted to move the latch members into engagement with the hub portion of a spare wheel, an operating handle attached to the cam, and locking means to prevent movement of the operating handle.

4. In a spare wheel lock, the combination of an abutment having a central position, means for supporting the abutment from the main frame of an automobile, latch members slidably mounted adjacent the abutment, a cam having a central stem which fits into the central opening of the abutment, said cam being adapted to press endwise against the latch members, an operating handle having an arcuate arm secured to the central stem of the cam, and locking means in contact with the arcuate arm when in operative position.

5. In a spare wheel lock, the combination of an abutment having a central opening, the abutment being supported on a post from the main frame of an automobile, a lock housing secured to the abutment and containing a spring pressed detent, latch members slidably mounted adjacent the abutment, a cam having a central stem fitting into the central opening of the abutment, the cam being adapted to move the latch members into engagement with the hub of a wheel, an operating handle with an arcuate arm having a serrated edge secured to the central stem, the arcuate arm being adapted to enter the lock housing and engage with the detent, and a lock barrel adapted to engage the detent to disengage it from the arcuate arm.

6. In a spare wheel lock, the combination of an abutment having radial openings and being supported from the frame of an automobile, spring retracted latch members slidably mounted in the radial openings, a cam adapted to move the latch members into engagement with the hub of a spare wheel, an operating handle attached to the cam, a detent normally restraining movement of the handle in one direction, and a key controlled means coacting with the detent for removing restraint against handle movement in another direction.

7. In a lock of the class described, in combination, an abutment secured to an automobile frame, latch members adjacent the abutment adapted to engage the hub of the wheel, an operating handle supported on the abutment and having operating connection with the latch members, a lock housing containing a spring pressed detent and having a shoulder formed along one edge of an opening in the housing, an arcuate arm projecting from the operating handle and having a shoulder and a serrated edge formed thereon, the shoulder on the arm adapted to engage the shoulder on the lock housing to prevent access to the detent which engages the serrated edge of the arcuate arm, and a lock cylinder having an offset pin rotatably secured in the lock housing, the offset pin adapted to be moved to engage the detent to release the arcuate arm.

8. In a spare wheel lock, the combination of an abutment supported from the main frame of an automobile, latch members slidably mounted on the abutment, and a cam adapted to move the latch members into engagement with the hub portion of a spare wheel.

9. In a spare wheel lock, the combination of an abutment supported from the main frame of an automobile, latch members having inwardly curved ends slidably mounted on the abutment, a cam adapted to move the latch members into engagement with the hub portion of a spare wheel, and means for operating the cam.

10. In a spare wheel lock, the combination of an abutment having a central position, means for supporting the abutment from the main frame of an automobile, latch members slidably mounted adjacent the abutment, a cam having a central stem which fits into the central opening of the abutment, said cam being adapted to spread the latch members apart, and means for operating the cam.

11. In a spare wheel lock, the combination of an abutment having radial openings and being supported from the frame of an automobile, spring retracted latch members slidably mounted in the radial openings, a cam adapted to move the latch members into engagement with the hub of a spare wheel, means for operating the cam, and a detent normally restraining movement of the handle in one direction.

In testimony whereof, I have hereunto set my hand this 13th day of February, 1930.

BENJAMIN S. MOORE.